United States Patent
J.A.Soeterbroek et al.

(10) Patent No.: US 11,498,321 B2
(45) Date of Patent: Nov. 15, 2022

(54) MULTILAYER TUBE, PARTICULARLY FOR FLUIDS

(71) Applicants: FLUORTUBING BV, Utrecht (NL); TUBIGOMMA DEREGIBUS S.R.L., Saccolongo (IT)

(72) Inventors: Alexander J.A.Soeterbroek, Bosch en Duin (NL); Andrea Deregibus, Padua (IT)

(73) Assignees: FLUORTUBING BV, Utrecht (NL); TUBIGOMMA DEREGIBUS S.R.L., Saccolongo (IT)

( * ) Notice: Subject to any disclaimer, the term of this patent is extended or adjusted under 35 U.S.C. 154(b) by 40 days.

(21) Appl. No.: 16/863,801

(22) Filed: Apr. 30, 2020

(65) Prior Publication Data
US 2020/0346448 A1 Nov. 5, 2020

(30) Foreign Application Priority Data
May 2, 2019 (IT) .......................... 102019000006477

(51) Int. Cl.
| F16L 11/02 | (2006.01) |
| B32B 27/32 | (2006.01) |
| B32B 1/08 | (2006.01) |
| B32B 25/08 | (2006.01) |
| B32B 27/08 | (2006.01) |

(52) U.S. Cl.
CPC .............. *B32B 27/322* (2013.01); *B32B 1/08* (2013.01); *B32B 25/08* (2013.01); *B32B 27/08* (2013.01); *B32B 2307/202* (2013.01); *B32B 2307/70* (2013.01); *B32B 2597/00* (2013.01)

(58) Field of Classification Search
CPC .. F16L 11/02; F16L 11/04; F16L 11/08; F16L 11/127
USPC ........ 138/123–126, 137, 140, 141; 428/36.1, 428/36.91, 36.4
See application file for complete search history.

(56) References Cited

U.S. PATENT DOCUMENTS

| 4,394,705 A | * | 7/1983 | Blachman | ................. H05F 3/02 138/125 |
| 5,142,782 A | * | 9/1992 | Martucci | .............. B29D 23/001 156/149 |

(Continued)

FOREIGN PATENT DOCUMENTS

| EP | 1462701 A1 | 9/2004 |
| EP | 2103856 A1 | 9/2009 |

(Continued)

OTHER PUBLICATIONS

IT Search Report dated Dec. 17, 2019 re: Application No. IT 102019000006477, pp. 1-7, citing: EP 1 462 701 A1, EP 3 162 557 A1, EP 2 918 885 A1, EP 2 103 856 A1 and EP 3 257 668 A1.

*Primary Examiner* — Patrick F Brinson
(74) *Attorney, Agent, or Firm* — Cantor Colburn LLP

(57) ABSTRACT

A multilayer tube, particularly for fluids, includes a sheath made of fluorinated polymers which is located in an innermost layer, which is adapted to be in contact with a circulating fluid, and is constituted by coupling a first, nonconducting material to a second, black-pigmented material that is electrically at least antistatic in the form of one or more continuous strips. The sheath has a smooth internal surface and is reinforced with external layers that are predominantly made of rubber.

8 Claims, 3 Drawing Sheets

(56) References Cited

U.S. PATENT DOCUMENTS

| | | | | | |
|---|---|---|---|---|---|
| 5,170,011 | A | * | 12/1992 | Martucci | B32B 27/08 |
| | | | | | 138/137 |
| 5,192,476 | A | * | 3/1993 | Green | B29C 63/10 |
| | | | | | 264/137 |
| 5,974,649 | A | * | 11/1999 | Marena | F16L 11/10 |
| | | | | | 29/458 |
| 6,257,280 | B1 | * | 7/2001 | Marena | F16L 11/10 |
| | | | | | 138/146 |
| 6,302,150 | B1 | * | 10/2001 | Martucci | B29D 23/001 |
| | | | | | 138/125 |
| 7,588,057 | B2 | * | 9/2009 | Bentley | F16L 11/088 |
| | | | | | 138/140 |
| 7,861,746 | B2 | * | 1/2011 | Zimmer | F16L 9/125 |
| | | | | | 138/140 |
| 9,506,584 | B2 | * | 11/2016 | Van Hooren | F16L 11/20 |
| 2013/0011595 | A1 | * | 1/2013 | Martino | B32B 27/12 |
| | | | | | 428/35.8 |
| 2017/0114929 | A1 | * | 4/2017 | Deregibus | B32B 27/12 |

FOREIGN PATENT DOCUMENTS

| | | |
|---|---|---|
| EP | 2918885 A1 | 9/2015 |
| EP | 3162557 A1 | 5/2017 |
| EP | 3257668 A1 | 12/2017 |

* cited by examiner

MULTILAYER TUBE, PARTICULARLY FOR FLUIDS

CROSS REFERENCE TO RELATED APPLICATIONS

This application is related to, and claims the benefit of, Italian patent application no. 102019000006477, filed on May 2, 2019, the contents of which are hereby incorporated by reference in their entirety.

TECHNICAL FIELD

The present disclosure relates to a multilayer tube, particularly for fluids, which finds applications in many and varied sectors, such as for example the food sector, the chemical sector, the pharmaceutical sector and the cosmetics sector.

BACKGROUND

Nowadays multilayer tubes for fluids under pressure are known and widespread, which have as an inner layer a sheath made of fluorinated polymers that comprises one or more black pigmented strips which are electrically at least antistatic.

It is also known to subject the outer surface of the inner sheath, which is made of fluorinated polymers such as FEP, MFA, PFA, ECTFE and PTFE, to a cementing process, a chemical process that makes the fluorinated polymer bondable by adhesive to other surfaces, something that would otherwise not be possible because surface non-adhesiveness is one of the principal characteristics of fluorinated polymers, in order to enable stable adhesion with the subsequent layer, generally made with organic elastomers such as for example EPDM, and inorganic elastomers such as for example silicone.

The sheath is normally made with a layer of PTFE and is in contact with the fluid.

The resistance of the tube to chemicals and to high temperatures is ensured by the PTFE, but the mechanical integrity needs to be reinforced.

Reinforcement of the tube makes it possible to reach an operating pressure that appreciably exceeds that which can be reached with the tube alone.

An example of reinforcement is constituted by a layer of conveniently interwoven stainless steel fibers.

It is possible to provide two or three layers of interwoven fibers by also using other types of fibers, such as, for example, glass fibers, polyester fibers, polypropylene fibers, or high-performance polyaramid fibers such as, for example, Kevlar.

Such conventional techniques have a number of drawbacks.

The applications of such types of tube require that the tube be flexible, in order to be capable of being bent and curved.

In order to be able to obtain this, the tubes are made by extrusion and convoluted in a subsequent step.

The tube passes through a heated die that melts the PTFE to generate a spiral path of peaks and valleys inside it.

An essential requirement of the convolution process is that it ensures that the thickness of the wall of the tube remains uniform, i.e. that the tube is not stretched.

In fact, any thinning of the wall can weaken the tube and lower the value of its burst pressure.

A first drawback is constituted by the fact that the fluid, by interacting with the internal surface of the undulating/corrugated sheath, during its passage, is subject to hydraulic turbulence, with flow resistances over the length of the tube.

A second drawback is due to the fact that the sheath, in order to be capable of being corrugated/undulated, starting from a co-extruded multilayer material, requires a greater amount of material than a comparable non-corrugated/undulating sheath, and the production method entails a considerable expenditure of time since it involves several steps.

Furthermore, the internally undulated/corrugated sheath determines an inconvenient, inaccurate and ineffective cleaning of the residues of fluids that circulated previously.

Also, the internally undulated/corrugated sheath determines a problem relating to connections, in that it is not possible to insert connectors with spigots that are externally smooth into it, because there is insufficient contact between the external surface of the spigot and the internal surface of the sheath and infiltrations could develop inside the tube.

SUMMARY

The aim of the present disclosure is to provide a multilayer tube which is capable of improving the known art in one or more of the above mentioned aspects.

Within this aim, the disclosure provides a multilayer tube that allows the tube to be flexible, without the need to have convolutions on the internal surface of the sheath yet withstanding pressures comparable and/or similar to those of similar, conventional multilayer tubes.

The disclosure also provides a multilayer tube in which hydraulic turbulence does not arise, with flow resistances over the length of the tube, upon the passage of a fluid.

The disclosure further provides a multilayer tube that determines an easier, more accurate and more effective cleaning of the residues of fluids that circulated previously, with respect to similar, conventional multilayer tubes.

The disclosure provides a multilayer tube that allows a connection even with externally smooth spigots while avoiding the risk of infiltrations of fluid in the tube.

The present disclosure overcomes the drawbacks of the known art in an alternative manner to any existing solutions.

The disclosure also provides a multilayer tube that is highly reliable, easy to implement and of low cost.

This aim and these and other advantages which will become better apparent hereinafter are achieved by providing a multilayer tube, particularly for fluids, which comprises a sheath made of fluorinated polymers which is located in the innermost layer, is adapted to be in contact with a circulating fluid, and is constituted by the coupling between a first, nonconducting material and a second, black-pigmented material that is electrically at least antistatic in the form of one or more continuous strips, characterized in that said sheath has a smooth internal surface and is reinforced with external layers that are predominantly made of rubber.

BRIEF DESCRIPTION OF THE DRAWINGS

Further characteristics and advantages of the disclosure will become better apparent from the description of a preferred, but not exclusive, embodiment of the multilayer tube according to the disclosure, which is illustrated by way of non-limiting example in the accompanying drawings wherein.

DETAILED DESCRIPTION OF THE DRAWINGS

Figure 1:
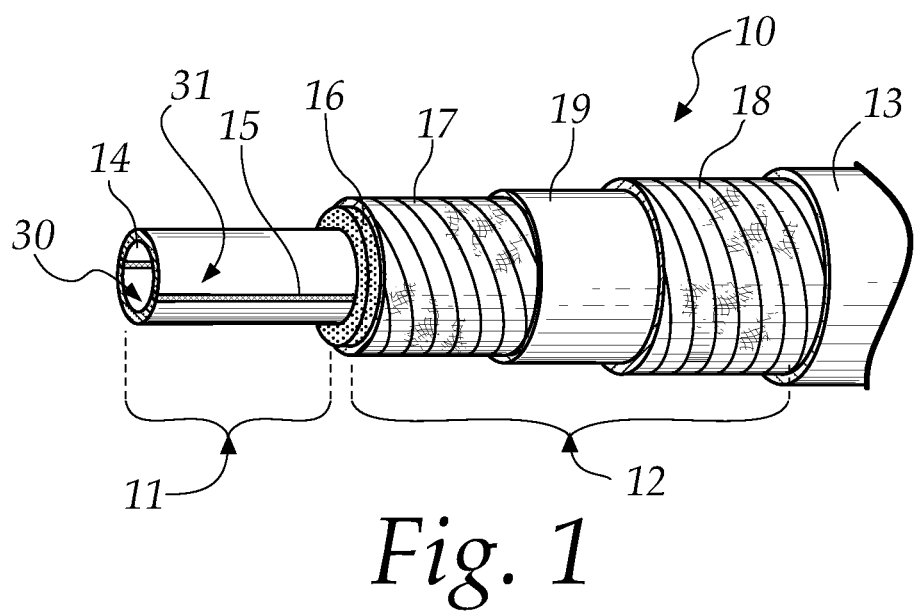
FIG. 1 is a schematic perspective view of a multilayer tube in a first embodiment thereof.

In the exemplary embodiments that follow, individual characteristics, given in relation to specific examples, may actually be interchanged with other different characteristics that exist in other exemplary embodiments.

With reference to FIGS. 1-5, the reference numeral 10, 110 generally designates a multilayer tube, particularly for fluids, according to the disclosure.

The multilayer tube 10, 110 comprises a sheath 11, 111, located in the innermost layer, which is adapted to be placed in direct contact with a fluid in transit.

The multilayer tube 10, 110 further comprises one or more intermediate reinforcement layers 12, 112, described below, which are arranged coaxially to the sheath 11, 111, and an external covering layer 13, 113, which is made of elastomeric material and is coaxial to the one or more reinforcement layers 12, 112.

The sheath 11, 111 is co-extruded and made of fluorinated polymers.

Such fluorinated polymers can be any one of FEP, MFA, PFA, ECTFE and PTFE.

The sheath 11, 111, is constituted by coupling a first, nonconducting material 14, 114, which is white and/or transparent and/or another color, to a second, black-pigmented material that is electrically at least antistatic in the form of one or more continuous strips 15, 115.

The two materials 14, 114 and 15, 115 are coupled by way of a process that is known, as explained below.

Such one or more strips 15, 115, in black-pigmented material that is electrically at least antistatic, make it possible for the sheath 11, 111, to discharge any electricity present.

It should be noted that an essential advantage of a tube with a structure according to the present disclosure is that it is conducting/antistatic, but with the least possible application of lampblack inside the sheath 11, 111.

This aspect is particularly advantageous in applications for the pharmaceutical and cosmetic industries, where the presence of lampblack in the sublayers of tubes is not accepted. Minimizing the quantity of lampblack inside the sheath also minimizes the possibility of migration and leaching of substances from the sheath to the fluid.

Figure 2:
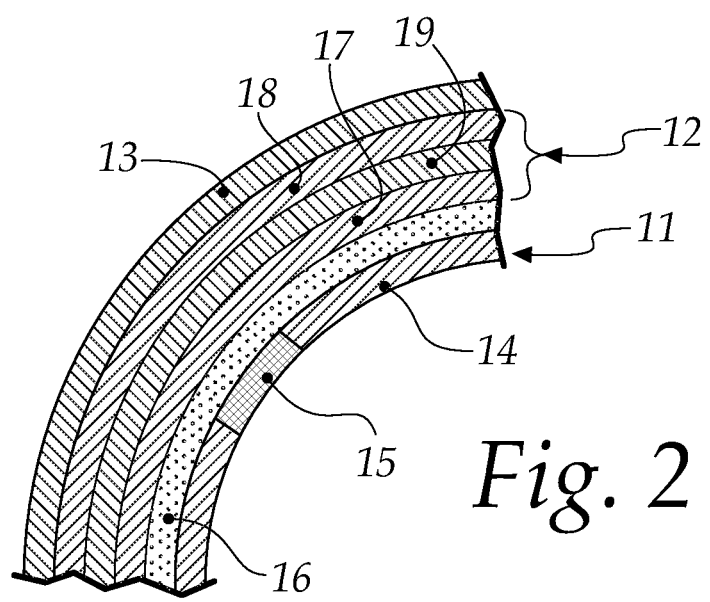
FIG. 2 is a cross-sectional view of the tube in FIG. 1.
Figure 3:
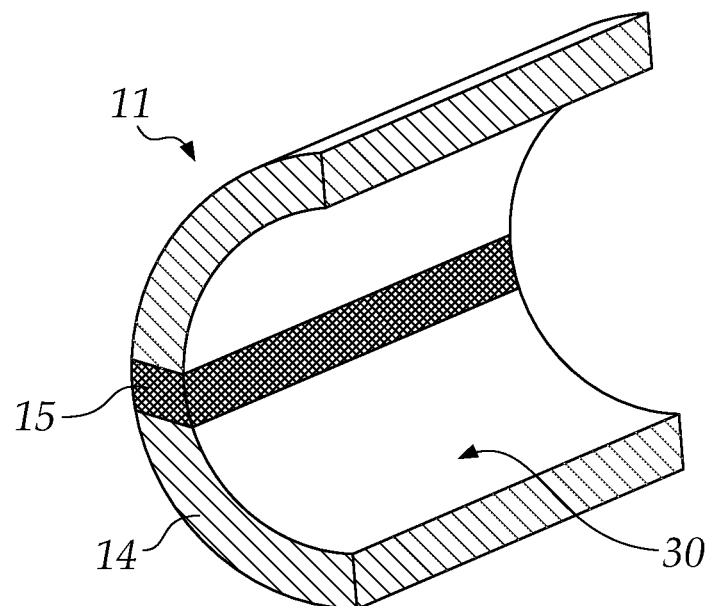
FIG. 3 is a perspective cross-sectional view of a detail of the tube in FIGS. 1 and 2.

In particular, in a first embodiment, shown in FIGS. 1, 2 and 3, such one or more strips 15 are two in number and have a longitudinal extension, parallel to the axis of extension of the multilayer tube 10.

Figure 4:
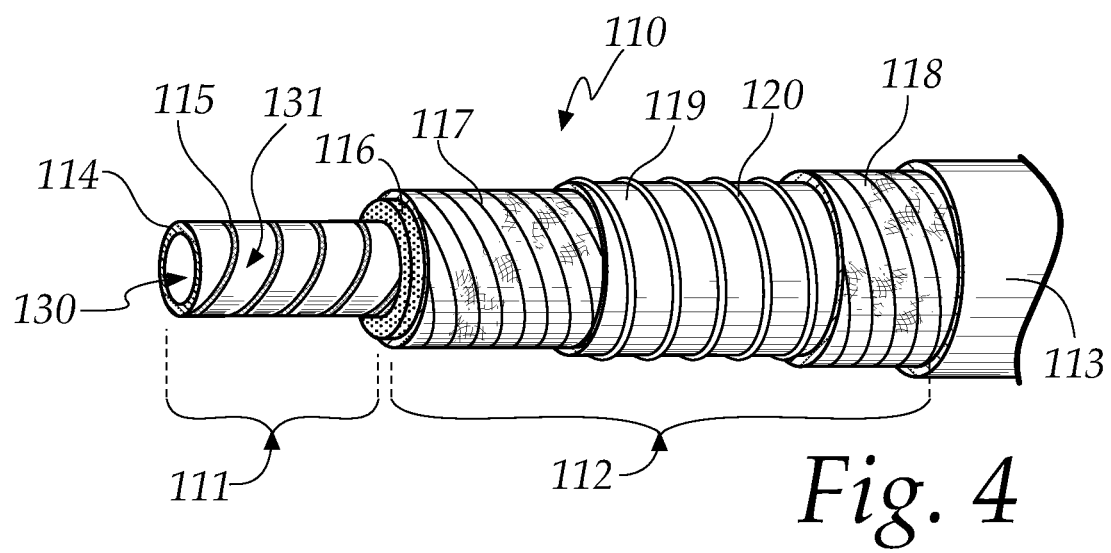
FIG. 4 is a schematic perspective view of a multilayer tube in a second embodiment thereof.

In a second embodiment, shown in FIG. 4, there is a single strip 115 of black-pigmented material that is electrically at least antistatic. Such strip 115 has a helical extension about the longitudinal axis of the tube 110.

The sheath 11, 111, has a smooth internal surface 30, 130.

Figure 5:
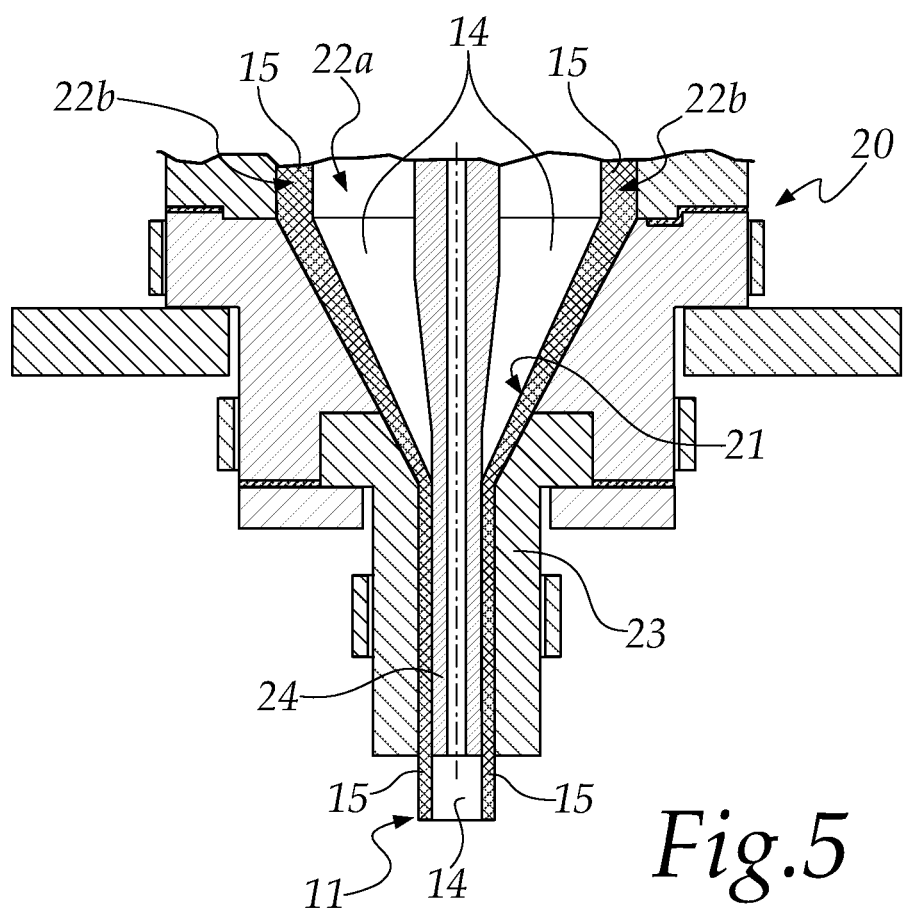
FIG. 5 is a cross-sectional view of a step of the procedure for providing a part of a multilayer tube illustrated in FIGS. 1 to 4.

With reference to FIG. 5, the first material 14 and the second material 15 are extruded, simultaneously in a die 20.

The die 20 has an impression 21 divided into different zones 22a, 22b in which the individual materials 14 or 15 are extruded simultaneously and are then associated during expulsion from the die 20, passing through a matrix die 23.

The die 20 comprises a matrix die 23, in which the impression of the die 20 narrows down to a dimension equal to the outside diameter of the sheath 11.

The matrix die 23 is arranged in the section where the extruded sheath 11 exits, inside which a drill spindle 24 is interposed which is adapted to define the passage inside the sheath 11.

In particular the drill spindle 24 has a smooth external surface, which is adapted to generate a smooth internal surface 30 of the sheath 11.

The first material 14 and the second material 15 are pushed toward the matrix die 23 and forced to pass through it by one or more pushers, not shown in the figure, which move with respect to a portion arranged opposite the portion occupied by the matrix die 23.

The term "internal surface of the sheath" is used in the present description to mean the surface of the sheath that is adapted to be in contact with the circulating fluid.

The term "smooth" is used in the present description to mean that the surface has a homogeneous level and does not present roughness or unevenness.

This characteristic makes it possible to prevent the creation of turbulence in the fluid during its passage.

Furthermore, by virtue of such characteristic it is possible to attach connectors with spigots that are externally smooth while avoiding infiltrations of fluid in the tube.

Also, the smooth internal surface 30 of the sheath 11, 111 allows an effective cleaning of the conduit.

Such sheath 11, 111 has an external surface 31, 131 which is cemented by way of a chemical process that renders the fluorinated polymer bondable by adhesive to other surfaces.

The term "external surface of the sheath" is used in the present description to mean the surface of the sheath that is adapted to be in contact with the innermost reinforcement layer 12, 112.

The sheath 11, 111 and the innermost intermediate reinforcement layer 12, 112 are coupled stably by way of the interposition of a layer of rubber 16, 116.

Such layer 16, 116 of rubber enables the structure 10, 110 to be flexible, without the need to corrugate/undulate the internal surface of the sheath 11, 111.

Advantageously, the layer 16, 116 of rubber is black and conducting in order to ensure conductivity through the structure of the tube and therefore the dissipation of electrostatic charge.

The covering layer 13, 113 is made of rubber.

Specifically, in a first embodiment, shown in FIGS. 1, 2 and 3, such intermediate reinforcement layers 12 comprise at least one first textile reinforcement layer 17, and in particular they comprise a first and a second textile reinforcement layer 17 and 18, with the interposition of a filler layer 19 made of elastomeric material.

The first and the second textile reinforcement layer 17 and 18 are made, by way of example, of PET polyester or aramid fabric.

The filler layer 19 of elastomeric material is made, advantageously, of rubber.

In a second embodiment, shown in FIG. 4, the intermediate reinforcement layers 112 comprise at least a third textile reinforcement layer 117 and in particular they comprise a first and a second textile reinforcement layer 117 and 118, with the interposition of a second filler layer 119 made of elastomeric material, coaxially to which a reinforcement spiral 120 is stably wound and associated, with variable inclination and pitch according to the applicative and productive requirements.

The third and the fourth textile reinforcement layer 117 and 118 are made, by way of example, of PET polyester or of aramid fabric.

The filler layer 119 of elastomeric material is made, advantageously, of rubber.

The reinforcement spiral 120 is made of metallic material, such as for example carbon steel, galvanized or stainless. Alternatively such reinforcement spiral 120 is made of a thermoplastic material.

The choice of material, the arrangement and the number of helices can vary and depends on the production technology, on the type of characteristics sought and on the type of performance required from the tube.

The principal advantage is that a multilayer tube is provided that avoids the need to make it convoluted, because instead of convolutions it uses layers of rubber for flexibility.

In practice it has been found that the disclosure fully achieves the intended aim and objects by providing a multilayer tube in which hydraulic turbulence does not arise, with flow resistances over the length of the tube, upon the passage of a fluid.

With the disclosure a multilayer tube has been devised that determines an easier, more accurate and more effective cleaning of the residues of fluids that circulated previously, with respect to similar, conventional multilayer tubes.

Furthermore, with the disclosure a multilayer tube has been provided that allows a connection even with externally smooth spigots while avoiding the risk of infiltrations of fluid in the tube.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

What is claimed is:

1. A multilayer tube comprises: a sheath made of fluorinated polymers which is located in an innermost layer, is adapted to be in contact with a circulating fluid, and is constituted by coupling a first, nonconducting material to a second, black-pigmented material that is electrically at least antistatic in the form of one or more continuous strips, said first nonconducting material being coupled to said one or more continuous strips by co-extrusion wherein the one or more continuous strips radially traverses said first nonconducting material, wherein said sheath has a smooth internal surface and is reinforced with external layers that are predominantly made of rubber, and further comprises one or more intermediate reinforcement layers arranged coaxially to said sheath, and an external covering layer made of elastomeric material and is coaxial to said one or more reinforcement layers, said one or more intermediate reinforcement layers comprising at least one first textile reinforcement layer and at least one second textile reinforcement layer, with the interposition of a filler layer made of elastomeric material, wherein said one or more continuous strips have a helical extension.

2. The multilayer tube according to claim 1, wherein said fluorinated polymers are constituted by any one of FEP, MFA, PFA, ECTFE, and PTFE.

3. The multilayer tube according to claim 1, wherein said sheath has an external surface cemented by a chemical process that renders the fluorinated polymer bondable by adhesive to other surfaces.

4. The multilayer tube according to claim 1, wherein said sheath and said one or more intermediate reinforcement layers are coupled stably by way of the interposition of a layer of rubber.

5. The multilayer tube according to claim 4, wherein said rubber layer is black and conducting.

6. The multilayer tube according to claim 1, wherein said covering layer is made of rubber.

7. The multilayer tube according to claim 1, wherein said one or more intermediate reinforcement layers comprise said first textile reinforcement layer and said second textile reinforcement layer with the interposition of said second filler layer made of elastomeric material, coaxially to which one or more reinforcement spirals, made of metallic and/or thermoplastic material, is stably wound and associated.

8. The multilayer tube according to claim 1, wherein said first nonconducting material is white and/or transparent and/or another color.

\* \* \* \* \*